United States Patent
Moon et al.

(10) Patent No.: US 9,059,454 B2
(45) Date of Patent: Jun. 16, 2015

(54) LEAD TAB ASSEMBLY AND BATTERY MODULE WITH THE SAME

(71) Applicant: SAMSUNG SDI CO., LTD., Yongin-si, Gyeonggi-do (KR)

(72) Inventors: Dae-Yon Moon, Yongin-si (KR); Han-Jun Wang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 118 days.

(21) Appl. No.: 13/690,393

(22) Filed: Nov. 30, 2012

(65) Prior Publication Data

US 2014/0072847 A1    Mar. 13, 2014

(30) Foreign Application Priority Data

Sep. 10, 2012  (KR) .................. 10-2012-0100141

(51) Int. Cl.
| | |
|---|---|
| *H01M 2/20* | (2006.01) |
| *H01M 2/34* | (2006.01) |
| *H01M 10/42* | (2006.01) |
| *H01M 2/22* | (2006.01) |
| *H01M 10/48* | (2006.01) |

(52) U.S. Cl.
CPC .............. *H01M 2/204* (2013.01); *H01M 2/348* (2013.01); *H01M 10/425* (2013.01); *H01M 2200/103* (2013.01); *H01M 2220/30* (2013.01); *H01M 2/22* (2013.01); *H01M 10/486* (2013.01)

(58) Field of Classification Search
CPC ....... H01M 2/22; H01M 2/202; H01M 10/48; H01M 10/486; H01M 2/34–2/348
See application file for complete search history.

(56) References Cited

U.S. PATENT DOCUMENTS

| | | | |
|---|---|---|---|
| 6,423,441 B1 * | 7/2002 | Ronning et al. ................. | 429/82 |
| 6,503,647 B1 | 1/2003 | Sugiyama et al. | |
| 2002/0182481 A1 | 12/2002 | Ehara | |
| 2006/0166086 A1 | 7/2006 | Kato | |
| 2006/0194101 A1 | 8/2006 | Ha et al. | |

(Continued)

FOREIGN PATENT DOCUMENTS

| | | |
|---|---|---|
| JP | 08-167409 A | 6/1996 |
| JP | 11-339766 A | 12/1999 |
| JP | 2007-273179 | 10/2007 |

(Continued)

OTHER PUBLICATIONS

Full English Machine Translation of JP 2007-273179, dated Oct. 18, 2007, 19 pages.
Full English Machine Translation of JP 2008-235028, dated Oct. 2, 2008, 19 pages.

(Continued)

*Primary Examiner* — Ula C Ruddock
*Assistant Examiner* — Scott J Chmielecki
(74) *Attorney, Agent, or Firm* — Christie, Parker & Hale LLP (57) ABSTRACT

A battery module includes a plurality of rechargeable unit cells; and a lead tab assembly that electrically connects the unit cells together, wherein the lead tab assembly includes a first lead tab extending in a first direction and that is electrically connected to a first unit cell of the unit cells; a second lead tab that extends in the first direction and that is electrically connected to a second unit cell of the unit cells; a temperature-sensing element that is located between the first lead tab and the second lead tab and is electrically connected to the first lead tab and the second lead tab; and an insulating member that accommodates at least a portion of the first lead tab, the second lead tab, and the temperature-sensing element.

19 Claims, 5 Drawing Sheets

(56) References Cited

U.S. PATENT DOCUMENTS

2009/0098418 A1     4/2009    Byun et al.
2012/0148876 A1*   6/2012    Zeng et al. ................ 429/7

FOREIGN PATENT DOCUMENTS

| | | |
|---|---|---|
| JP | 2008-235028 | 10/2008 |
| JP | 2012-113973 | 6/2012 |
| KR | 10-2002-0086228 | 11/2002 |
| KR | 10-2006-0073432 | 6/2006 |
| WO | WO 2005/060025 A1 | 6/2005 |

OTHER PUBLICATIONS

Full English Machine Translation of JP 2012-113973, dated Jun. 14, 2012, 26 pages.
EPO Office action dated Dec. 16, 2013, for corresponding European Patent application 13154610.3, (7 pages).
Full English Machine Translation of JP 08-167409 A, dated Jun. 25, 1996, 8 pages.
Full English Machine Translation of JP 11-339766 A, dated Dec. 10, 1999, 10 pages.
EPO Office action dated Dec. 1, 2014, for corresponding European Patent application 13154610.3, (3 pages).

* cited by examiner

LEAD TAB ASSEMBLY AND BATTERY MODULE WITH THE SAME

CROSS-REFERENCE TO RELATED APPLICATION

This application claims priority to and the benefit of Korean Patent Application No. 10-2012-0100141, filed on Sep. 10, 2012, in the Korean Intellectual Property Office, the disclosure of which is incorporated by reference herein in its entirety.

BACKGROUND

1. Field

One or more embodiments of the present invention relate to a lead tab assembly and a battery module including the same.

2. Description of the Related Art

With the development of wireless Internet or communication technology, the supply of portable computers that may be operated by using a battery instead of a power supply unit (PSU) has been rapidly increasing. In general, since portable computers are small in size and easy to carry, they have excellent portability and are thus widely used for business use or individual use. Portable computers may have an embedded-type battery pack to be used in various places without having to use a power supply unit. Also, the embedded-type battery pack may include a rechargeable unit cell.

SUMMARY

One or more embodiments of the present invention include a lead tab assembly and a battery module including the same.

Additional aspects will be set forth in part in the description which follows and will be apparent from the description.

According to one or more embodiments of the present invention, a battery module includes a plurality of unit cells that are rechargeable; and a lead tab assembly that electrically connects the unit cells, wherein the lead tab assembly includes: a first lead tab that is electrically connected to a first unit cell among the unit cells; a second lead tab that extends in a direction, which is the same as a longitudinal direction of the first lead tab, and that is electrically connected to a second unit cell among the unit cells; a temperature-sensing element that is located between the first lead tab and the second lead tab and is electrically connected to the first and second lead tabs; and an insulating member that accommodates at least parts of the first and second lead tabs and the temperature-sensing element.

The insulating member may include a first fixing unit that penetrates the second lead tab and via which one surface of the second lead tab contacts the insulating member.

The first fixing unit may include: a pillar portion penetrating the second lead tab; and a blocking portion that is substantially formed perpendicular to the pillar portion and contacts another surface of the second lead tab.

The blocking portion may be formed by heating.

The battery module may further include a third unit cell, and a third lead tab for electrically connecting the first unit cell and the third unit cell.

One end of the first lead tab may include a first groove, one end of the third lead tab may include a second groove, and the first and second grooves are located adjacent to each other to form a hole.

The insulating member may include a second fixing unit that penetrates the hole formed by the first and second grooves and via which the first and third lead tabs contact the insulating member.

The second fixing unit may include: a pillar portion penetrating the hole; and a blocking portion that is substantially formed perpendicular to the pillar portion.

The first groove and the second groove may be located spaced apart from each other and are surrounded by an insulating film.

The insulating member may include an opening formed in a region corresponding to the temperature-sensing element.

The insulating member may include an opening for welding between the first lead tab and the first unit cell.

The insulating member may include: a bottom surface for accommodating at least parts of the first and second lead tabs and the temperature-sensing element; and a side wall that extends in a direction perpendicular to the bottom surface.

The first lead tab may be connected to a first electrode of the first unit cell, the second lead tab may be connected to a second electrode of the second unit cell, and the first electrode of the first unit cell and the second electrode of the second unit cell may have opposite polarities.

The unit cell may have first and second electrodes, and wherein both the first electrode and the second electrode are formed on a top surface of the unit cell.

The battery module may further include a first high-current lead for applying current from the battery module to the outside, wherein at least a part of the first high-current lead may include a plurality of layers bent to overlap with each other.

According to one or more embodiments of the present invention, a lead tab assembly electrically connecting unit cells, the lead tab assembly includes a first lead tab extending in one direction; a second lead tab extending in a direction that is the same as the direction in which the first lead tab extends; a temperature-sensing element that is located between the first lead tab and the second lead tab and is electrically connected to the first and second lead tabs; and an insulating member that accommodates at least parts of the first and second lead tabs and the temperature-sensing element.

The lead tab assembly may further include a third lead tab that is located opposite to the second lead tab about the first lead tab and extends in a direction that is the same as the direction in which the first lead tab extends.

One end of the first lead tab may be welded to the temperature-sensing element, the other end of the first lead tab may include a first groove, and one end of the third lead tab may include a second groove formed in a location adjacent to the first groove.

The first and second grooves may be adjacent to each other to form a hole, and the insulating member may include a fixing unit that penetrates the hole and via which the first and third lead tabs contact the insulating member.

The second lead tab may include a hole, and the insulating member may include a fixing unit that penetrates the hole and via which the second lead tab contacts the insulating member.

According to one or more embodiments of the present invention, a battery module includes the lead tab assembly as described herein; and a plurality of unit cells that are electrically connected to one another by the lead tab assembly.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, the inventive concept will be described more fully with reference to the accompanying drawings, in which exemplary embodiments of the invention are shown. The inventive concept may, however, be embodied in many different forms and should not be construed as limited to the exemplary embodiments set forth herein. Rather, these embodiments are provided so that this disclosure will be thorough and complete, and will fully convey the scope of the invention to those of ordinary skill in the art. The terminology used herein is for the purpose of describing particular embodiments only and is not intended to be limiting of the inventive concept. As used herein, the singular forms 'a', 'an', and 'the' are intended to include the plural forms as well, unless the context clearly indicates otherwise. It will be further understood that the terms "comprises" and/or 'comprising,' when used in this specification, specify the presence of stated features, integers, operations, elements, and/or components, but do not preclude the presence or addition of one or more other features, integers, operations, elements, components, and/or groups thereof. It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section. Expressions such as "at least one of," when preceding a list of elements, modify the entire list of elements and do not modify the individual elements of the list.

Figure 1:
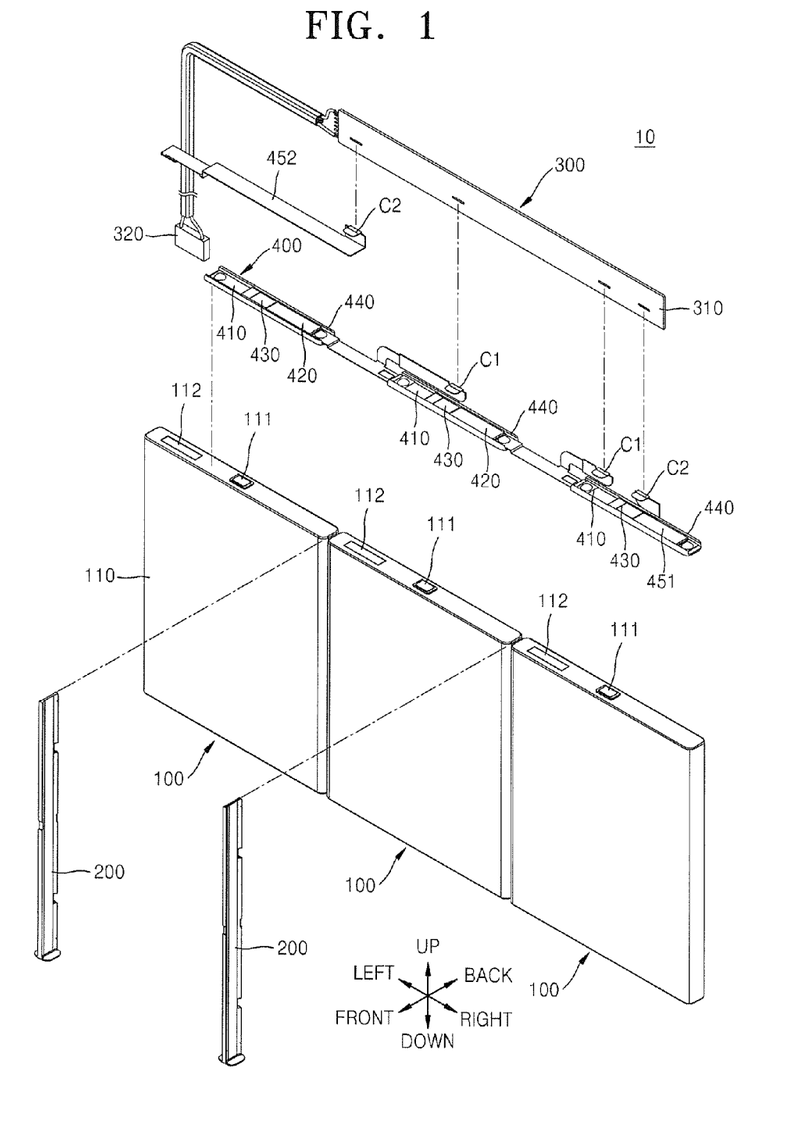
FIG. 1 is an exploded perspective view schematically showing a battery module according to an embodiment of the present invention.

FIG. 1 is an exploded perspective view schematically showing a battery module 10 according to an embodiment of the present invention.

Referring to FIG. 1, the battery module 10 may include a plurality of unit cells 100, a plurality of spacers 200 located between the unit cells 100, a protection circuit module 300, and a lead tab assembly 400.

Each of the unit cells 100 is a rechargeable secondary battery and may be formed of a lithium-ion cell. The unit cell 100 includes an electrode assembly and a can 110 for accommodating the electrode assembly. The electrode assembly may be manufactured by stacking a positive electrode plate, a negative electrode plate, and a separator which is located between the positive electrode plate and the negative electrode plate, and winding the stack in a jelly roll shape. The can 110 may be manufactured of a metal material. For example, the can 110 may be manufactured of aluminum or an aluminum alloy, but the present is not limited thereto. A negative electrode 111 and a positive electrode 112 of the unit cell 100 may be located on the same surface, for example, on a top surface of the unit cell 100.

The unit cells 100 may be oriented side-by-side in one direction so that the negative electrodes 111 and the positive electrodes 112 are located on the top surfaces of the respective unit cells 100. For example, the unit cells 100 may be connected to the lead tab assembly 400 in series.

In the current embodiment, three unit cells 100 are connected to one another in series to constitute one battery module 10. However, the number of unit cells 100 constituting the battery module 10 is not limited there to, and may vary. Also, the unit cells 100 may be connected to one another in parallel or a combination of series and parallel.

Each of the spacers 200 is located between the adjacent unit cells 100 to insulate the unit cells 100. As described above, when an exterior material of the unit cell 100 is the can 110 formed of a metal, the spacers 200 may be located between the unit cells 100 arranged in parallel to insulate the unit cells 100. The spacer 200 may include an insulating material, such as plastic.

The protection circuit module 300 may be electrically connected to the unit cells 100 via the lead tab assembly 400. For example, the protection circuit module 300 and the unit cells 100 may be electrically connected to each other via a plurality of connecting terminals C1, which protrude from the lead tab assembly 400, and a plurality of connecting terminals C2 of first and second high-current leads 451 and 452 for forming a high-current terminal of the battery module 10.

The protection circuit module 300 may prevent overheating and an explosion resulting from overcharge, overdischarge, or overcurrent. The protection circuit module 300 may include a substrate 310 and a protection device that is mounted on one side of or inside the substrate 310. The protection device may be selectively formed of a safety device, which includes a passive device such as a resistor or a capacitor, or an active device such as a field effect transistor (FET), or may be formed of a plurality of integrated circuits. A connector 320 for supplying power to an external electronic device may be located at one side of the protection circuit module 300.

The lead tab assembly 400 may electrically connect the unit cells 100. The lead tab assembly 400 may include a plurality of first lead tabs 410, a plurality of second lead tabs 420, a plurality of temperature-sensing elements 430, and a plurality of insulating members 440.

The first lead tab 410 may be electrically connected to any one of the unit cells 100 that are adjacent to one another, the second lead tab 420 may be electrically connected to the other unit cell 100, and the temperature-sensing element 430 may be welded between the first and second lead tabs 410 and 420. The temperature-sensing element 430 may function as a fuse for blocking current when a temperature of the unit cell 100 exceeds a reference value. For example, the temperature-sensing element 430 may be a thermal cutoff (TCO).

The first lead tab 410 may be electrically connected to a negative electrode of a unit cell 100 by welding, and the second lead tab 420 may be electrically connected by welding to a positive electrode of a second unit cell 100 which is adjacent to a first unit cell 100 so that the neighboring unit cells 100 may be connected to one another in series. Although the unit cells 100 are connected to one another in series in the current embodiment, the unit cells 100 may be connected to one another in parallel in another embodiment.

The insulating member 440 may accommodate the first lead tab 410, the temperature-sensing element 430, and at least a part of the second lead tab 420. The insulating member 440 may be located between the top surface of the unit cell 100 and bottom surfaces of the first and second lead tabs 410 and 420 to insulate the first and second lead tabs 410 and 420 from the unit cell 100.

The first and second high-current leads 451 and 452 may be located at both ends of the unit cells 100 that are electrically connected to one another. The first high-current lead 451 may be located on the rightmost insulating member 440, and the second high-current lead 452 may be located on the leftmost insulating member 440. The second high-current lead 452 may extend over the unit cell 100 in a longitudinal direction of the lead tab assembly 400.

Widths (i.e., widths in an anteroposterior direction in FIG. 1) of the first and second lead tabs 410 and 420 of the lead tab assembly 400 and the first and second high-current leads 451 and 452 may be formed to be the same as or less than a width of the unit cell 100 so that the lead tab assembly 400 and the first and second high-current leads 451 and 452 may be located in a small space.

Hereinafter, detailed structures of and electrical connections between the lead tab assembly 400 and the first and second high-current leads 451 and 452 will be described with reference to FIGS. 2 to 4.

Figure 2:
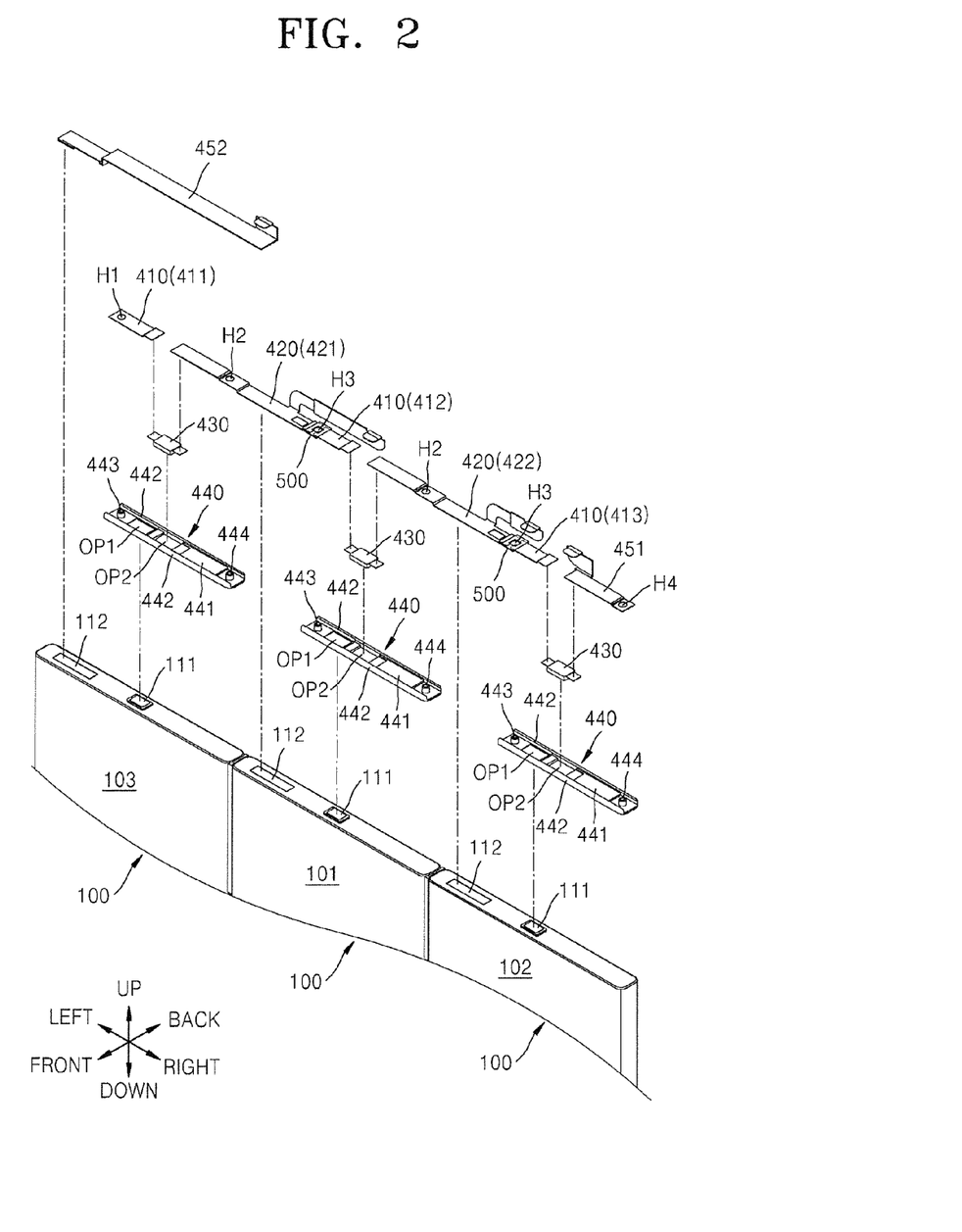
FIG. 2 is a perspective view showing a lead tab assembly, first and second high-current leads, and parts of unit cells shown in FIG. 1.

FIG. 2 is a perspective view showing the lead tab assembly 400, the first and second high-current leads 451 and 452, and parts of the unit cells 100 shown in FIG. 1. In FIG. 2, for ease of description, the unit cells 100 are composed of a first unit cell 101, and second and third unit cells 102 and 103 which are located on either side of the first unit cell 101. A broken line shown in FIG. 2 represents a welding relationship between the components shown in FIG. 2.

Referring to FIG. 2, the first lead tab 410 and the second lead tab 420 may be alternately located in a longitudinal direction (horizontal direction of FIG. 2) of the lead tab assembly 400. Each first lead tab 410 may be welded to the negative electrode 111 of the unit cell 100, each second lead tab 420 may be welded to the positive electrode 112 of the unit cell 100, and the temperature-sensing element 430 may be welded between the first and second lead tabs 410 and 420.

Hereinafter, for ease of description, the first lead tabs 410 that are located in order in a direction from left to right are indicated as reference numerals 411 to 413, and the second lead tabs that are located in order in a direction from left to right are provided with reference numerals 421 and 422, so as to distinguish the first lead tabs 410 and the second lead tab 420 that are located at different locations.

For example, the leftmost first lead tab 411 may be welded to the negative electrode 111 of the third unit cell 103, and may be electrically connected to the second lead tab 421 by welding to the temperature-sensing element 430. The second lead tab 421 may be welded to the positive electrode 112 of the first unit cell 101.

The first lead tab 412 located in the middle of the lead tab assembly 400 may be welded to the negative electrode 111 of the first unit cell 101, and may be electrically connected to the second lead tab 422 by welding to the temperature-sensing element 430. The second lead tab 422 may be welded to the positive electrode 112 of the second unit cell 102.

The first unit cell 101 and the second and third unit cells 102 and 103 may be connected to each other in series by connecting the first lead tabs 411 and 412 and the second lead tabs 421 and 422 to one another.

The first high-current lead 451 may be located on the rightmost insulating member 440. The rightmost first lead tab 413 may be welded to the negative electrode 111 of the second unit cell 102, and the first high-current lead 451 may be electrically connected to the first lead tab 413 via the temperature-sensing element 430, and thus the first high-current lead 451 may have a negative polarity. The temperature-sensing element 430 may be welded between the first high-current lead 451 and the first lead tab 413.

The second high-current lead 452 may be directly welded to the positive electrode 112 of the third unit cell 103, and thus the second high-current lead 452 may have a positive polarity. The second high-current lead 452 may extend in a longitudinal direction of the lead tab assembly 400.

The insulating member 440 may accommodate the first lead tab 410, the temperature-sensing element 430, and at least a part of the second lead tab 420. The insulating member 440 may include a bottom surface 441 and a side wall 442 that extends in a direction perpendicular to the bottom surface 441, that is, extends upwards.

The insulating member 440 may include a first opening OP1 in which a part of a region corresponding to the first lead tab 410 is opened, and a second opening OP2 in which a part of a region corresponding to the temperature-sensing element 430 is opened. The first lead tabs 410 may be welded to the negative electrodes 111 of the unit cells 100 via a plurality of the first openings OP1, respectively. The temperature-sensing element 430 is oriented to directly face the unit cell 100 via the second opening OP2 so that the temperature-sensing element 430 may sensitively react to a change in temperature of the unit cell 100. The second opening OP2 may be formed adjacent to the negative electrode 111 which may have a big change in temperature in the unit cell 100.

The insulating member 440 may include fixing units 443 and 444 for respectively fixing the first and second lead tabs 411 and 421 to the insulating member 440. The fixing units 443 and 444 may protrude in the same direction as the side wall 442, that is, protrude upwards. In one embodiment, the insulating member 440 may include the fixing units 443 and 444 that are separately located at both ends of the insulating member 440.

The first fixing unit 443 located at the leftmost side of the insulating member 440 may be coupled to a hole H1 of the first lead tab 411. For example, the first fixing unit 443 may fix the first lead tab 411 to the insulating member 440 by passing through the hole H1 of the first lead tab 411 and then applying heat to an upper end of the first fixing unit 443, for example, by heating. Similarly, the second fixing unit 444 of the insulating member 440 that is located at the rightmost side of the insulating member 440 may pass through a hole H2 of the second lead tab 421 and then may be heated. By heating, the first and second lead tabs 411 and 421 may be fixed to the insulating member 440.

The first fixing unit 443 of the insulating member 440 located in the middle of the lead tab assembly 400 may be coupled to a hole H3 formed between the second lead tab 421 and the first lead tab 412. When ends of the first lead tab 412 and the second lead tab 421, which are located adjacent to each other, are spaced from each other, an insulating film 500 may surround the ends of the first lead tab 412 and the second lead tab 421 and define the hole H3. The first fixing unit 443 may pass through the hole H3 and then may be heated. The second fixing unit 444 of the insulating member 440 located in the middle of the lead tab assembly 400 may pass through the hole H2 of the second lead tab 422 and then may be heated.

The first fixing unit 443 of the insulating member 440 located at the rightmost side of the lead tab assembly 400 may be coupled to the hole H3 formed between the second lead tab 422 and the first lead tab 413, and may be coupled to a hole H4 formed in the first high-current lead 451.

Figure 3:
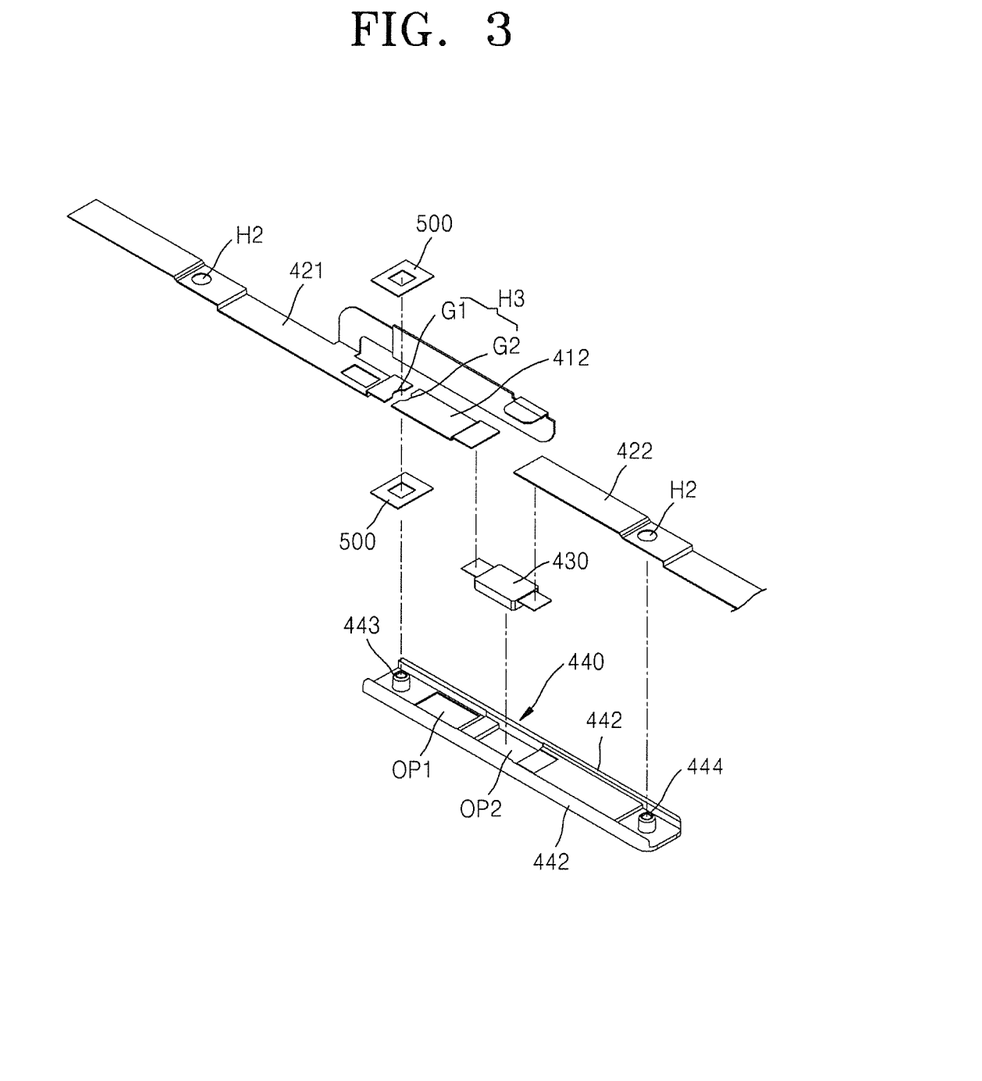
FIG. 3 is an exploded perspective view showing an insulating member and lead tabs which are located on both sides of the insulating member shown in FIG. 2.

FIG. 3 is an exploded perspective view showing an insulating member and lead tabs which are located at both sides of the insulating member shown in FIG. 2. FIG. 4 is a perspective view showing when components shown in FIG. 3 are coupled to one another. FIGS. 3 and 4 show the insulating member 440 located in the middle of the lead tab assembly 400 shown in FIG. 2, the first lead tab 412 that is located on the insulating member 440, the temperature-sensing element 430 and the second lead tab 422 that are located on the right side of the first lead tab 412, and the second lead tab 421 that is located on the left side of the first lead tab 412.

Figure 4:
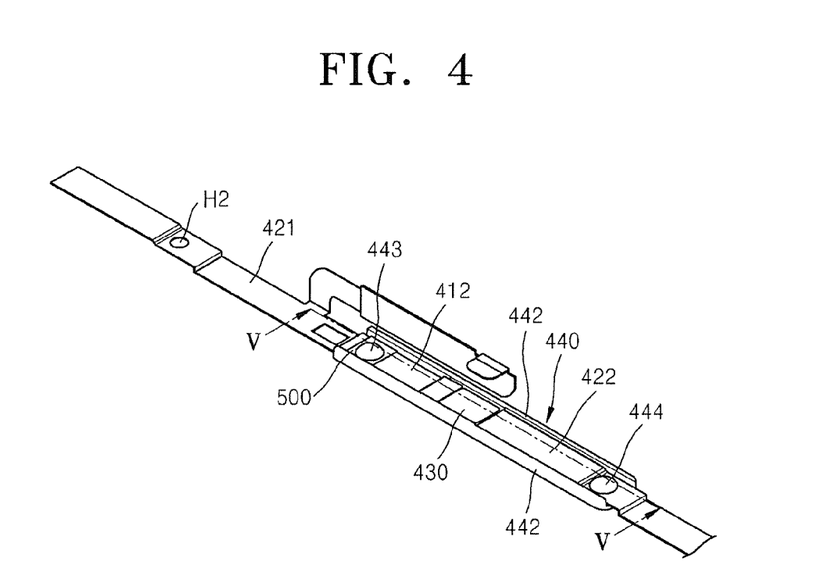
FIG. 4 is a perspective view showing when components shown in FIG. 3 are coupled to one another.

FIG. 3 shows a state before the first and second lead tabs 412, 421 and 422 are fixed to the insulating member 440 by heating, and FIG. 4 shows a state after the first and second lead tabs 412, 421, and 422 are fixed to the insulating member 440 by heating.

Referring to FIGS. 3 and 4, the first lead tab 412 and the second lead tab 422, which are on the right side of the first lead tab 412, may be electrically connected to each other while the temperature-sensing element 430 is located therebetween. The first lead tab 412 may be oriented to correspond to the first opening OP1 of the insulating member 440, and the temperature-sensing element 430 may be oriented to correspond to the second opening OP2 of the insulating member 440. The hole H2 formed in the second lead tab 422 located on the right side of the first lead tab 412 may be coupled to the second fixing unit 444 formed on the insulating member 440. For example, the second fixing unit 444 shown in FIG. 3 passes through the hole H2 formed in the second lead tab 420 and then is heated, and thus the second fixing unit 444 may have a shape as shown in FIG. 4. An upper portion of the second fixing unit 444 may contact an upper portion of the second lead tab 420 as a result of heating the upper portion of the second fixing unit 444.

A left end portion of the first lead tab 412 and a right end portion of the second lead tab 421 may include grooves G2 and G1, respectively. The groove G1 of the first lead tab 412 and the groove G2 of the second lead tab 421 may be located adjacent to each other to define the hole H3. The first and second lead tabs 412 and 421 may be spaced from each other so as not to be electrically connected to each other and may be surrounded by the insulating film 500. For example, the insulating film 500 may be a tape including an insulating material, such as polyimide (PI), and two insulating films 500 may be adhered to each other with the first and second lead tabs 412 and 421 therebetween.

The hole H3 formed by the first lead tab 412 and the second lead tab 421 located on the left side of the first lead tab 412 may be coupled to the first fixing unit 443 of the insulating member 440. For example, the first fixing unit 443 shown in FIG. 3 passes through the hole H3 formed by the grooves G1 and G2 of the first lead tab 412 and the second lead tab 421 that are located adjacent to each other, and then is heated, and thus the first fixing unit 443 may have a shape as shown in FIG. 4. An upper portion of the first fixing unit 443 may contact top surfaces of the first lead tab 412 and the second lead tab 421 as a result of heating the upper portion of the second fixing unit 444.

Figure 5:
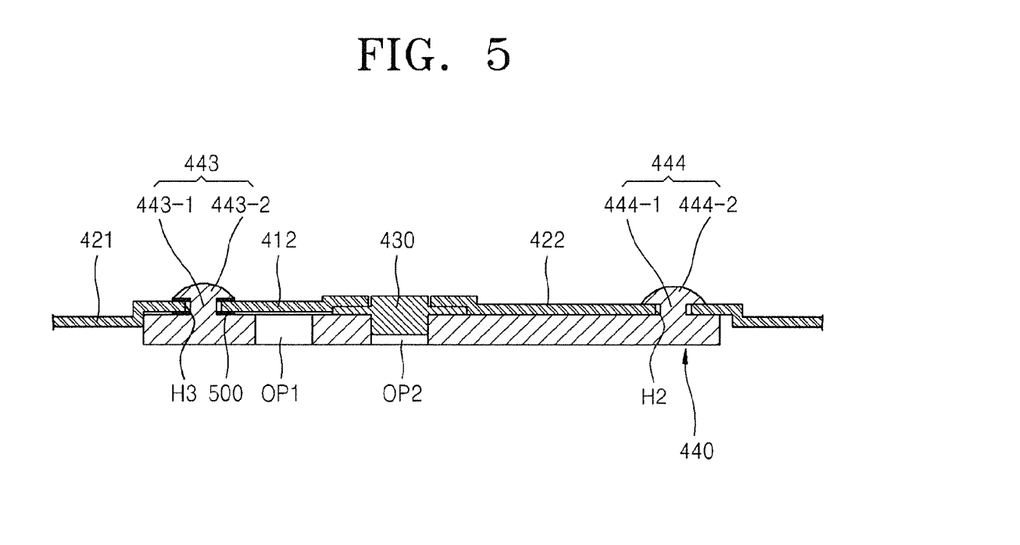
FIG. 5 is a cross-sectional view taken along line V-V of FIG. 4.

FIG. 5 is a cross-sectional view taken along line V-V of FIG. 4.

Referring to FIG. 5, the first fixing unit 443 may include a pillar portion 443-1 and a blocking portion 443-2 which is substantially perpendicular to the pillar portion 443-1, and the second fixing unit 444 may include a pillar portion 444-1 and a blocking portion 444-2 which is substantially perpendicular to the pillar portion 444-1.

The pillar portion 443-1 of the first fixing unit 443 extends upwards from a bottom surface of the insulating member 440, and may penetrate the hole H3 formed by the groove G1 of the first lead tab 412 and the groove G2 of the second lead tab 421 which are located adjacent to each other, as described above with reference to FIGS. 3 and 4.

The blocking portion 443-2 of the first fixing unit 443 is formed by heating, and prevents the first lead tab 412 and the second lead tab 421, which are mechanically integrated with each other by the insulating film 500, from being separated from the first fixing unit 443. For example, a bottom surface of the blocking portion 443-2 is located to face a top surface of the first lead tab 412 and a top surface of the second lead tab 421 and to contact the insulating film 500, and thus bottom surfaces of the first and second lead tabs 412 and 421 may contact the insulating member 440.

The pillar portion 444-1 of the second fixing unit 444 may extend upwards from the bottom of the insulating member 440, and may penetrate the hole H2 formed in the second lead tab 422 as described above with reference to FIGS. 3 and 4.

The blocking portion 444-2 of the second fixing unit 444 is formed by heating the second fixing unit 444, and may contact a top surface of the second lead tab 422 so as to prevent the second lead tab 422 from being separated from the second fixing unit 444. A bottom surface of the second lead tab 422 may contact the insulating member 440 by the blocking portion 444-2.

Figure 6:
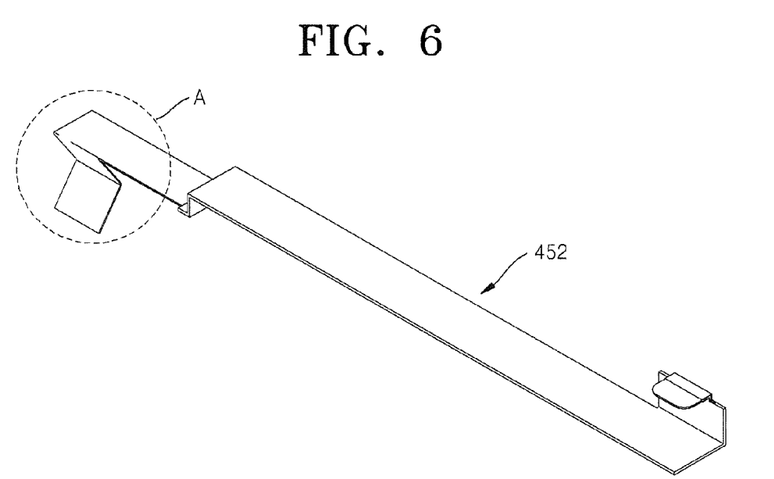
FIG. 6 is a partial perspective view of the second high-current lead shown in FIG. 2.

FIG. 6 is a partial perspective view of the second high-current lead 452 shown in FIG. 2.

Referring to FIG. 6, the second high-current lead 452 extends in the same direction as the lead tabs. At least a part (generally corresponding to part A of FIG. 6) of the second high-current lead 452 may include a plurality of layers. For example, a part of the second high-current lead 452 has three layers. In the second high-current lead 452, a part that is directly welded to the unit cell 10 may be bent to overlap itself, e.g. to form a Z-shape. The part of the second high-current lead 452 is bent, and thus the second high-current lead 452 may be located in a space above top surfaces of the unit cells 100. Although the current embodiment is a case where the part A of the second high-current lead 452 has three layers, the part A of the second high-current lead 452 may have two layers in another embodiment.

According to one or more embodiments of the present invention, a temperature-sensing element is inserted into a lead tab assembly that electrically connects unit cells so as to respond to a change in temperature of each of the unit cells through a simple structure.

Since a plurality of lead tabs may be integrally connected to one another through a relatively simple structure, such as a fixing unit, a manufacturing cost and time may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A battery module comprising:
   a plurality of rechargeable unit cells; and
   a lead tab assembly that electrically connects the unit cells together, wherein the lead tab assembly comprises:
   a first lead tab extending in a first direction and that is electrically connected to a first unit cell of the unit cells;
   a second lead tab that extends in the first direction and that is electrically connected to a second unit cell of the unit cells;

a temperature-sensing element that is located between the first lead tab and the second lead tab and is electrically connected to the first lead tab and the second lead tab; and an insulating member that accommodates at least a portion of the first lead tab, the second lead tab, and the temperature-sensing element, wherein the insulating member is between a respective one of the unit cells and the first lead tab.

2. The battery module of claim 1, wherein the insulating member comprises a first fixing unit that penetrates the second lead tab and via which one surface of the second lead tab contacts the insulating member.

3. The battery module of claim 2, wherein the first fixing unit comprises:
   a pillar portion penetrating the second lead tab; and
   a blocking portion that is substantially perpendicular to the pillar portion and contacts a surface of the second lead tab.

4. The battery module of claim 3, wherein the blocking portion is heat-formed.

5. The battery module of claim 1, further comprising a third unit cell, and a third lead tab electrically connecting the first unit cell and the third unit cell.

6. The battery module of claim 5, wherein one end of the first lead tab comprises a first groove, one end of the third lead tab comprises a second groove, and the first groove and the second grooves are located adjacent to each other to define a hole.

7. The battery module of claim 6, wherein the insulating member comprises a second fixing unit that penetrates the hole fowled by the first groove and the second groove and via which the first lead tab and the third lead tab contact the insulating member.

8. The battery module of claim 7, wherein the second fixing unit comprises:
   a pillar portion penetrating the hole; and
   a blocking portion that is oriented substantially perpendicular to the pillar portion.

9. The battery module of claim 6, wherein the first groove and the second groove are spaced from each other and are surrounded by an insulating film.

10. The battery module of claim 1, wherein the insulating member defines an opening in a region generally corresponding to the temperature-sensing element.

11. The battery module of claim 1, wherein the insulating member defines an opening for welding between the first lead tab and the first unit cell.

12. The battery module of claim 1, wherein the insulating member comprises:

a bottom surface for accommodating at least a portion of the first lead tab, the second lead tab, and the temperature-sensing element; and
a side wall that extends in a direction generally perpendicular to the bottom surface.

13. The battery module of claim 1, wherein the first lead tab is connected to a first electrode of the first unit cell, the second lead tab is connected to a second electrode of the second unit cell, and the first electrode of the first unit cell and the second electrode of the second unit cell have opposite polarities.

14. The battery module of claim 1, wherein the unit cell has a first electrode and a second electrode, and wherein both the first electrode and the second electrode are located on a top surface of the unit cell.

15. The battery module of claim 1, further comprising a first current lead for applying current from the battery module to the outside, wherein at least a part of the first current lead includes a plurality of layers overlapping each other.

16. A lead tab assembly electrically connecting unit cells, the lead tab assembly comprising:
   a first lead tab extending in a first direction;
   a second lead tab extending in the first direction;
   a temperature-sensing element located between the first lead tab and the second lead tab and being electrically connected to the first lead tab and the second lead tab;
   an insulating member that accommodates at least a portion of the first lead tab, the second lead tab, and the temperature-sensing element;
   a third lead tab located opposite to the second lead tab with respect to the first lead tab and extending in the first direction,
   wherein one end of the first lead tab is coupled to the temperature-sensing element, another end of the first lead tab comprises a first groove, and one end of the third lead tab comprises a second groove located adjacent to the first groove.

17. The lead tab assembly of claim 16, wherein the first and second grooves are adjacent to each other to define a hole, and the insulating member comprises a fixing unit that penetrates the hole and via which the first lead tab and the third lead tab contact the insulating member.

18. The lead tab assembly of claim 16, wherein the second lead tab has a hole, and the insulating member comprises a fixing unit that penetrates the hole and via which the second lead tab contacts the insulating member.

19. A battery module comprising:
   the lead tab assembly of claim 16; and
   a plurality of unit cells that are electrically connected to one another by the lead tab assembly.

* * * * *